Oct. 15, 1946.  R. C. ALLEN ET AL  2,409,177
JET PROPULSION APPARATUS
Filed April 1, 1942
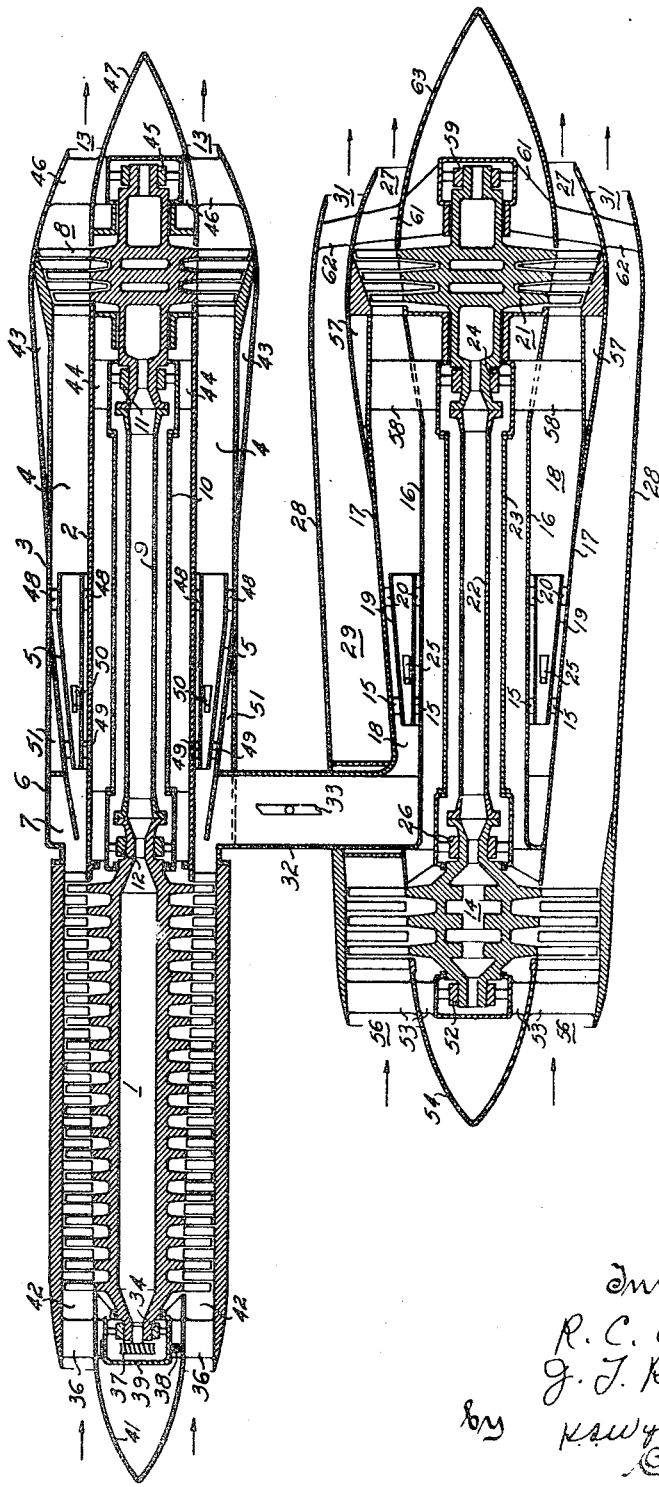
Inventors
R. C. Allen
J. T. Rettaliata
by K. S. Wyman
Attorney Patented Oct. 15, 1946

2,409,177

UNITED STATES PATENT OFFICE 2,409,177

JET PROPULSION APPARATUS

Robert C. Allen and John T. Rettaliata, Wauwatosa, Wis., assignors to Allis-Chalmers Manufacturing Company, Milwaukee, Wis., a corporation of Delaware Application April 1, 1942, Serial No. 437,162

9 Claims. (Cl. 60—35.6)

1

This invention relates generally to power developing units and more particularly to the manner of combining and operating a plurality of power developing units for the jet propulsion of aircraft and other types of vehicles.

In this connection, dual jet propulsion units embodying gas turbine and internal combustion engine driven compressor combinations have heretofore been proposed and in one such combination, a portion of the air delivered by the turbine driven compressor is further compressed in the internal combustion engine driven compressor and this additionally compressed air together with the exhaust gases from the engine is passed through the turbine and then expanded to atmosphere to provide a propelling jet while an additional propelling jet is provided by expanding the unheated portion of the air delivered by the turbine driven compressor directly to atmosphere. In another such combination, the air is first compressed in the internal combustion engine driven compressor and a portion of the air is then heated and expanded to atmosphere to provide a propelling jet while the remainder of the air, which is to be used in supercharging the engine, is further compressed in a turbine driven compressor operated by exhaust gases from the engine and the exhaust from the turbine is expanded to atmosphere to provide an additional propelling jet. Generally, the entire propelling effect is produced by the reaction effect of the jet or jets although in some instances the gas turbine or internal combustion engine is also used to drive a conventional propeller.

These known combinations are rendered impractical for the jet propulsion of vehicles either (1) by the use of high velocity, and consequently low propulsive efficiency jets (propulsive efficiency increases as the velocity ratio, i. e., the translational velocity of the vehicle divided by the velocity of the propelling jet, approaches unity) or (2) by the weight factor, i. e., the quotient obtained by dividing the weight of the vehicle by the thrust horsepower developed, becoming excessive when the capacity of internal combustion engine driven compressor unit is increased sufficiently to suitably compress the large mass of gas which is necessary in order to produce a high propulsive efficiency jet or jets. The gas turbine as used in said known combinations constitutes means for efficiently recovering a portion of the energy present in the engine exhaust gases, but it affords little if any advantage with respect to the formation of propulsive jets since all of the power developed by said turbine is required for super-

2 charging the internal combustion engine. In fact, the addition of an engine driven propeller to such combinations is necessary in order to render them practical even at low speeds, but since the propeller efficiency is extremely low at speeds capable of attainment by jet propulsion, the net result is a material reduction in propulsive efficiency which renders the combination even more impractical for high speed operation.

It is therefore the primary object of this invention to provide an improved jet propulsion unit by combining and operating a plurality of power developing units in a manner affording a practical degree of operating efficiency. In this connection, it is now established that the thermal efficiency of a gas turbine is a function of compression ratio; that for a turbine inlet temperature of 1500° F. or more, the compression ratio should be at least ten to one in order to obtain maximum thermal efficiency; that a compression ratio of ten to one is entirely too high to produce a high propulsive efficiency jet by passing heated or unheated compressed air directly to atmosphere through a passage and nozzle structure having practical dimensions; that, if all of the air compressed to a ratio of ten to one or more is passed through the turbine, it is necessary, in order to prevent the unit from running away, to reduce the pressure drop in the turbine which results in the pressure of the exhaust gases being entirely too high to produce a high propulsive efficiency jet for the speeds now deemed practical; and that when employing a gas turbine, combustion chamber and compressor combination as a power developing unit, means must be provided for efficiently utilizing the excess power developed when operating under conditions effective to produce maximum thermal efficiency.

Accordingly, another object of this invention is to provide an improved jet propulsion unit embodying a plurality of combinations of gas turbine, combustion chamber and compressor correlated in a novel manner to effect maximum thermal and propulsive efficiencies.

Still another object of this invention is to provide an improved jet propulsion unit embodying a lower pressure compressing means drivingly connected with a combustion gas turbine, a high pressure compressing means drivingly connected with another combustion gas turbine, means including combustion chambers connecting the inlets of said turbines with the high pressure compressing means, and nozzle means connected to receive the exhaust gases from the turbines and the air discharged from the low pressure compressing means.

The invention accordingly consists of the various features of construction, combinations of elements and arrangements of parts as more fully set forth in the appended claims and in the detailed description, in which the drawing illustrates a dual jet propulsion unit embodying the invention.

Referring to the drawing, it is seen that the jet propulsion unit comprises a first coaxial combination embodying a high pressure axial compressor 1, inner and outer shells 2 and 3 defining therebetween an annular passage 4 having disposed therein a rearwardly flaring annular mixing and combustion tube 5, an annular structure 6 which encloses the discharge end of the compressor 1 and the adjacent end of the outer shell 3 and forms therewith an annular manifold 7 into which the end of the shell 3 projects and divides the air issuing from the compressor 1 between the passage 4 and the manifold 7, an axial flow gas turbine 8 receiving a mixture of air and combustion gases from the passage 4 and being drivingly connected with the compressor 1 by means of a hollow shaft 9 disposed within a tube 10 connecting the casings of the adjacent turbine and compressor rotor supporting bearings designated 11 and 12, respectively, and a rearwardly directed jet forming nozzle 13; a second coaxial combination embodying a low pressure axial compressor 14, an inner shell 16 and a surrounding shell 17 having their forward ends joined together adjacent the compressor 14 and defining therebetween an annular passage 18 which is closed at its forward end and which has supported therein, by means of radially extending struts 15 and 20, a rearwardly flaring annular mixing and combustion tube 19 provided with a circumferential series of fuel nozzles, an axial flow gas turbine 21 having its inlet connected to the rear end of the passage 18 and being drivingly connected with the compressor 14 by means of a hollow shaft 22 disposed within a tube 23 connecting the casings of the adjacent turbine and compressor rotor supporting bearings designated 24 and 26, respectively, a rearwardly directed jet forming nozzle 27 through which the turbine 21 exhausts, and an outer open ended shell 28 which surrounds the shell 27 and forms therewith an annular passage 29, which receives the air discharged from the compressor 14, an annular rearwardly directed jet forming nozzle 31 which surrounds the nozzle 27; and a crossover duct 32 which includes a valve 33, connecting the manifold 7 with the forward end of the passage 18.

The forward end of the rotor of compressor 1 is supported in a bearing 34 which is in turn supported from compressor casing by means of a circumferential series of struts 36. The forward end of the rotor is extended beyond the bearing 36 and provided with a worm gear 37 which meshes with the worm (not shown) on a shaft 38 disposed within the gear box 39. The exposed end of the shaft 38 is splined as indicated for establishing a driving connection with a starting prime mover (not shown). The bearing 34, gear 37 and gear box 39 are enclosed in a hollow conical-shaped casing member 41 which may be removably attached to the adjacent end of the compressor casing and to the struts 36 in any suitable manner in order to provide for ready access to the enclosed parts and which forms with outer forwardly extending portions of the compressor casing an annular compressor inlet passage 42. The turbine 8 is supported within the rear end portion of the outer shell 1 by means of a circumferential series of radially extending ribs or the like designated 43 and the forward bearing 11 is supported within the inner shell 2 by means of a circumferential series of radially extending struts 44. The rear end of the turbine rotor is supported by a bearing 45 which is in turn supported within the outer shell 3 by means of a circumferential series of radially extending struts 46. The rear end of the turbine rotor and the bearing 45 are enclosed in a hollow conical-shaped casing member 47 which may be removably attached to the struts 46 and the rotor casing in order to provide for ready access to the portions enclosed thereby. The annular mixing and combustion tube 5 which is supported within the annular passage by axially spaced circumferential series of radially extending struts designated 48 and 49, includes a circumferential series of fuel spraying nozzles 50. If desired, the connection between the outer shell 3 and the annular manifold forming structure 6 may be reinforced as shown by a circumferential series of ribs 51.

The forward end of the rotor of compressor 14 is supported in a bearing 52 which is in turn supported from the compressor casing by means of a circumferential series of struts 53. The bearing 52 and the hub portion of the rotor are enclosed in a hollow conical-shaped casing member 54 which may be removably attached to the adjacent end of the compressor casing and the struts 53 in order to provide for ready access to the portions enclosed thereby and which forms with the outer forwardly extending portion of the compressor casing an annular compressor inlet passage 56. The turbine 21 is supported in the rear end portion of the shell 17 by means of radially extending ribs or the like 57 and the forward bearing is supported by a circumferential series of radially extending struts 58 which extend through the inner shell 16 and are secured to the inner surface of the shell 17. The rear end of the turbine rotor is supported by a bearing 59 which is in turn supported within the shell 17 by means of a circumferential series of struts 61. The rear ends of the shells 17 and 28 are maintained in spaced nozzle forming relation by means of a circumferential series of struts 62. The rear end of the turbine rotor and the bearing 59 are enclosed in a conical-shaped casing member 63 which may be removably attached to the turbine casing and the struts 61 in order to provide for ready access to the portions enclosed thereby and form with the rear end portion of the shell 17, the annular nozzle 27 through which the turbine exhausts.

The unit is started by closing the valve 33, connecting a starting prime mover to the shaft 38, and rotating the compressor and turbine and simultaneously combusting fuel delivered through the nozzles 50, keeping the valve 33 closed, until the unit comprising the compressor 1 and turbine 8 is self-operating, whereupon the starting motor is disconnected, the valve 33 opened and the unit comprising the compressor 14 and turbine 21 started by introducing fuel through the nozzles 25 and gradually increasing the fuel supply until self-operation is obtained. During normal operation, the air discharged from the compressor 1, which is compressed to a sufficient degree to produce maximum thermal efficiency, is divided by the forward end portion of the shell 3 into two streams, one of which flows through the passage 4, the turbine 8 and the nozzle 13 and the other of which flows through the crossover duct 32, the passage 18, the turbine 21 and the nozzle 27. The air discharged from the compressor 14 is compressed to a much lesser degree than that discharged from the compressor 1 and only sufficiently to produce a high propulsive efficiency jet by passing the air directly to atmosphere through a passage and nozzle structure having practical dimensions, such for example, as the passage 29 and nozzle 31. All of the air discharged from the compressor 14 flows through the passage 29 and nozzle 31 and produces a high propulsive efficiency jet. The compressor 1 has sufficient capacity to meet the requirements of the turbines 8 and 21 and to efficiently utilize all of the excess power developed by the turbine 8 and the compressor 14 has sufficient capacity to efficiently utilize all of the power developed by the turbine 21. The manner of combining and operating a plurality of combustion turbine units in accordance with this invention provides means for efficiently utilizing the excess power developed by the turbines and in addition enables each plant to be operated at all times under conditions producing maximum thermal and propulsive efficiencies.

The invention is applicable generally to the jet propulsion of vehicles embodying a plurality of combustion turbine power developing units, and it should therefore be understood that it is not desired to limit the invention to the exact details of operation and construction herein shown and described as various modifications within the scope of the appended claims may occur to persons skilled in the art.

It is claimed and desired to secure by Letters Patent:

1. A jet propulsion unit comprising a high pressure compressing means, a gas turbine drivingly connected with said high pressure compressing means, a low pressure compressing means, another gas turbine drivingly connected with said low pressure compressing means, means including combustion chambers connecting the discharge of said high pressure compressing means with the inlets of said turbines, and jet forming nozzle means receiving the exhaust gases from said turbines and the air discharged from said low pressure compressing means.

2. A jet propulsion unit comprising a high pressure compressing means, a gas turbine drivingly connected with said high pressure compressing means, a low pressure compressing means, another gas turbine drivingly connected with said low pressure compressing means, means including combustion chambers connecting the discharge of said high pressure compressing means with the inlets of said turbines, a jet forming nozzle structure receiving the exhaust gases from said turbine, another jet forming nozzle structure receiving the exhaust gases from said other turbine, and means forming a passage for conducting the air discharged from said low pressure compressing means to one of said nozzle structures.

3. A jet propulsion unit comprising a high pressure compressing means, a gas turbine drivingly connected with said high pressure compressing means, a low pressure compressing means, another gas turbine drivingly connected with said low pressure compressing means, means including combustion chambers connecting the discharge of said high pressure compressing means with the inlets of said turbines, a jet forming nozzle structure receiving the exhaust gases from said turbine, another jet forming nozzle structure receiving the exhaust gases from said other turbine, and means forming a passage for conducting the air discharged from said low pressure compressing means to said other nozzle structure.

4. A jet propulsion unit comprising a high pressure compressing means, a gas turbine axially spaced from and drivingly connected with said high pressure compressing means, passage forming means disposed between and connecting the discharge of said high pressure compressing means with the inlet to said turbine, said passage forming means including a combustion chamber, a jet forming nozzle structure receiving the exhaust gases from said turbine, a low pressure compressing means, another gas turbine drivingly connected with said low pressure compressing means, means including another combustion chamber connecting the discharge of said high pressure compressing means with the inlet to said other turbine, another jet forming nozzle structure receiving the exhaust gases from said other turbine, and means forming a passage for conducting the air discharged from said low pressure compressing means to said other nozzle structure.

5. A jet propulsion unit comprising a high pressure compressing means, a gas turbine axially spaced from and drivingly connected with said high pressure compressing means, passage forming means defining a combustion chamber disposed between and connecting the discharge of said high pressure compressing means with the inlet to said turbine, a jet forming nozzle structure receiving the exhaust gases from said turbine, a low pressure compressing means, another gas turbine axially spaced from and drivingly connected with said low pressure compressing means, additional passage forming means, including another combustion chamber disposed between said low pressure compressing means and said other turbine, connecting the discharge of said high pressure compressing means with the inlet to said other turbine, another jet forming nozzle structure receiving the exhaust gases from said other turbine, and means forming a passage for conducting the air discharged from said low pressure compressing means to said other nozzle structure.

6. A jet propulsion unit comprising a high pressure compressing means, a gas turbine axially spaced from and drivingly connected with said high pressure compressing means, passage forming means defining an annular combustion chamber disposed in coaxial relation between and connecting the discharge of said high pressure compressing means with the inlet to said turbine, a coaxial jet forming nozzle structure receiving the exhaust gases from said turbine, a low pressure compressing means, another gas turbine axially spaced from and drivingly connected with said low pressure compressing means, additional passage forming means, including another annular combustion chamber disposed in coaxial relation between said low pressure compressing means and said other turbine, connecting the discharge of said high pressure compressing means with the inlet to said other turbine, another coaxial jet forming nozzle structure receiving the exhaust gases from said other turbine, and means forming a passage surrounding said other combustion chamber and turbine for conducting the air discharged from said low pressure compressing means to said other nozzle structure.

7. A jet propulsion unit comprising a high pressure axial compressor, an axial flow gas turbine axially spaced from and drivingly connected with said high pressure compressing means, passage forming means defining an annular combustion chamber disposed in coaxial relation between and connecting the discharge of said high pressure compressor with the inlet to said turbine, a coaxial jet forming nozzle structure receiving the exhaust gases from said turbine, a low pressure axial compressor, another gas turbine axially spaced from and drivingly connected with said low pressure compressor, additional passage forming means, including another annular combustion chamber disposed in coaxial relation between said low pressure compressor and said other turbine, connecting the discharge of said high pressure compressor with the inlet to said other turbine, another coaxial jet forming nozzle structure receiving the exhaust gases from said other turbine, and means forming a passage surrounding said other combustion chamber and turbine for conducting the air discharged from said low pressure compressor to said other nozzle structure.

8. A jet propulsion unit comprising a first coaxial combination of high pressure compressing means, a combustion chamber receiving air from said compressing means, a gas turbine receiving gases from said combustion chamber and being drivingly connected with said compressing means, and a jet forming nozzle structure receiving exhaust gases from said turbine; a second coaxial combination of low pressure compressing means, another combustion chamber, another gas turbine receiving exhaust gases from said other combustion chamber and being drivingly connected with said low pressure compressing means, and another jet forming nozzle structure receiving exhaust gases from said other turbine, passage means connecting said other combustion chamber to receive air discharged from said high pressure compressing means; and means forming a passage for conducting the air discharged from said low pressure compressing means to said other nozzle structure.

9. A jet propulsion unit comprising a first coaxial combination of high pressure compressing means, a combustion chamber receiving air from said compressing means, a gas turbine receiving gases from said combustion chamber and being drivingly connected with said compressing means; a second coaxial combination of low pressure compressing means, another combustion chamber, another gas turbine receiving exhaust gases from said other combustion chamber and being drivingly connected with said low pressure compressing means, passage means connecting said other combustion chamber to receive air discharged from said high pressure compressing means; and jet forming nozzle means receiving the exhaust gases from said turbines and the air discharged from said low pressure compressing means.

ROBERT C. ALLEN.
JOHN T. RETTALIATA.